United States Patent
Driesen

(10) Patent No.: US 8,356,010 B2
(45) Date of Patent: Jan. 15, 2013

(54) ONLINE DATA MIGRATION

(75) Inventor: Volker Driesen, Walldorf (DE)

(73) Assignee: SAP AG, Walldorf (DE)

( * ) Notice: Subject to any disclaimer, the term of this patent is extended or adjusted under 35 U.S.C. 154(b) by 140 days.

(21) Appl. No.: 12/854,789

(22) Filed: Aug. 11, 2010

(65) Prior Publication Data
US 2012/0041933 A1 Feb. 16, 2012

(51) Int. Cl.
*G06F 17/30* (2006.01)

(52) U.S. Cl. ........ 707/624; 707/610; 707/611; 707/613; 707/617; 707/618; 707/620; 707/626; 707/634; 707/635; 707/636; 707/637; 707/639; 707/640; 707/661; 707/674

(58) Field of Classification Search .................. 707/610, 707/611, 613, 617, 618, 620, 624, 626, 634, 707/635, 636, 637, 639, 640, 661, 674, 999.204
See application file for complete search history.

(56) References Cited

U.S. PATENT DOCUMENTS

| 6,591,272 | B1 | 7/2003 | Williams |
| 6,711,593 | B1 | 3/2004 | Gordon et al. |
| 2006/0004851 | A1 | 1/2006 | Gold et al. |
| 2010/0138821 | A1* | 6/2010 | Driesen et al. ................ 717/168 |

* cited by examiner

*Primary Examiner* — Syling Yen
(74) *Attorney, Agent, or Firm* — Mintz, Levin, Cohn, Ferris, Glovsky and Popeo, P.C.

(57) ABSTRACT

Data is recursively migrated during uptime from a first table to a second table in a first schema in a database while taking into account changes to the first table in a change table. The database has first and second application servers respectively connecting to the database using first and second schemas and running first and second versions of a software program. Downtime can be initiated to migrate the remaining entries in the change table to the second table, delete the first table, and rename the second table to have a same name as the first table prior to deletion so that during uptime the second application server connects to the second table and runs the second version of the software program. Related apparatus, systems, techniques and articles are also described.

19 Claims, 2 Drawing Sheets

ONLINE DATA MIGRATION

TECHNICAL FIELD

The subject matter described herein relates to incremental online data migration, and more specifically, data migration in the context of an upgrade during production time as opposed to downtime.

BACKGROUND

Downtime can occur during the upgrade of a software platform. Such downtime can be due to data migration issues. For example, in some systems, an application specific program is executed to convert the data structure and semantics from a version written by an old software version to the version required by a new software version. With conventional arrangements, such application specific programs are executed during downtime and require several hours for complicated or large platforms.

SUMMARY

In one aspect, data is migrated during uptime from a first table to a second table in a first schema in a database. A first application server connects to the database using the first schema. A second application server connects to the database using a second schema. The first application server runs a first version of a software program while the second application server runs a second version of the software program. The second schema has a first alias pointing to the first table and a second alias pointing to the second table. Entries are added during uptime to a change table in the first schema characterizing changes to the first table during the data migration. The second schema includes a change alias pointing to the change table. Subsequently, the second table is recursively updated to include the entries referred to in the change table using the second application server, data is read from the first alias corresponding to the entries referred to in the change table, and the data from the first alias is written to the second alias until a remaining number of the entries is below a pre-defined threshold. Later, downtime can be initiated to migrate the remaining entries in the change table to the second table, delete the first table, and rename the second table to have a same name as the first table prior to deletion so that during uptime the second application server connects to the second table and runs the second version of the software program.

The following describes different variations that can be implemented singly or in combination depending on the desired configuration. The first alias, second alias, and change alias can be deleted (e.g., deleted during downtime). The first alias, the second alias, and/or the change alias can comprise a database view, a database alias, or a database synonym. The second table can have at least one additional field as compared to the first table. The changes to the first table can comprise one or more of: an update, and insert, or a delete. A database trigger can monitor changes to the first table and generate entries in the change table characterizing the monitored changes. The database trigger can be a stored procedure. The entries in the change table can be generated by the database trigger as part of a single transaction along with a corresponding change to the first table. The aliases can allow for reading, updating, deleting, and inserting of entries in the corresponding table.

The migration of data can be initiated by a migration program forming part of application software being executed on the second application server. The migration program can determine whether entries in the change table require migration or have already been migrated.

The entries in the change table can include first and second fields with the first field including either a first designation indicating that a database trigger updated the entry in the change table or a second designation indicating that the migration program updated the entry in the change table and the second field comprising a sequence number. If there is only a single entry with the first designation, the entry can be considered to be new and it is migrated to the second table. If there is only a single entry with the second designation, the entry can be considered to have already been migrated. If there are entries with both the first designation and the second designation, the entry can be migrated to the second table if the sequence number for the entry with the first designation is higher than the sequence number for the entry with the second designation, or the entry can be skipped if the sequence number for the entry with the second designation is higher than the sequence number for the entry with the first designation.

There can be at least two instances adding entries during uptime to the change table in the first schema. Each of the at least two instances can add entries during uptime to the change table in the first schema are executed using separate servers.

The database trigger can be removed once the data has been completely migrated. The first application server can be different from the second application server or it can be the same.

In a further aspect, data is migrated during uptime using a migration program from a first table to a second table in a first schema in a database. A first application server connects to the database using the first schema and a second application server connects to the database using a second schema. The first application server runs a first version of a software program and the second application server runs a second version of the software program. The second schema has a first alias pointing to the first table and a second alias pointing to the second table. Entries are added during uptime using a database trigger to a change table in the first schema characterizing changes to the first table during the data migration. The second schema further includes a change alias pointing to the change table. Thereafter, the second table is recursively updated by the migration program to include the entries added to the change table until a remaining number of the entries is below a pre-defined threshold. Downtime is later initiated to migrate remaining entries in the change table to the second table, delete the first table, and rename the second table to have a same name as the first table prior to deletion so that during uptime the second application server connects to the second table and runs the second version of the software program.

In still a further aspect, data is migrated during uptime using a migration program from a first table to a second table in a first schema in a database. The database includes a second schema having a first alias pointing to the first table and a second alias pointing to the second table. Subsequently, entries are added during uptime using a database trigger to a change table in the first schema characterizing changes to the first table during the data migration. The second table is recursively updated by the migration program to include the entries added to the change table until a remaining number of the entries is below a pre-defined threshold. Downtime can then be initiated to migrate the remaining entries in the change table to the second table, delete the first table, and rename the second table to have a same name as the first table prior to deletion.

The first schema can be accessible by a first application server and the second schema can be accessible by a second application server. During downtime, the first table can be deleted and the second table can be renamed as the first table so that it is accessible by the second application server using the second alias. In addition, the second alias can have a name identical to the first table in the first schema and the first alias can have a name different from the first table in the first schema.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, the current subject matter enables application specific data migration with an application specific program in the context of an upgrade before downtime begins. During downtime, only a small remaining fraction of the data needs to be converted, which can in turn reduce the length of downtime. In addition, by using a shadow system, a second schema and aliases, software for a new release can be used to perform the migration which obviates the need for a migration program to be deployed with the old release.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
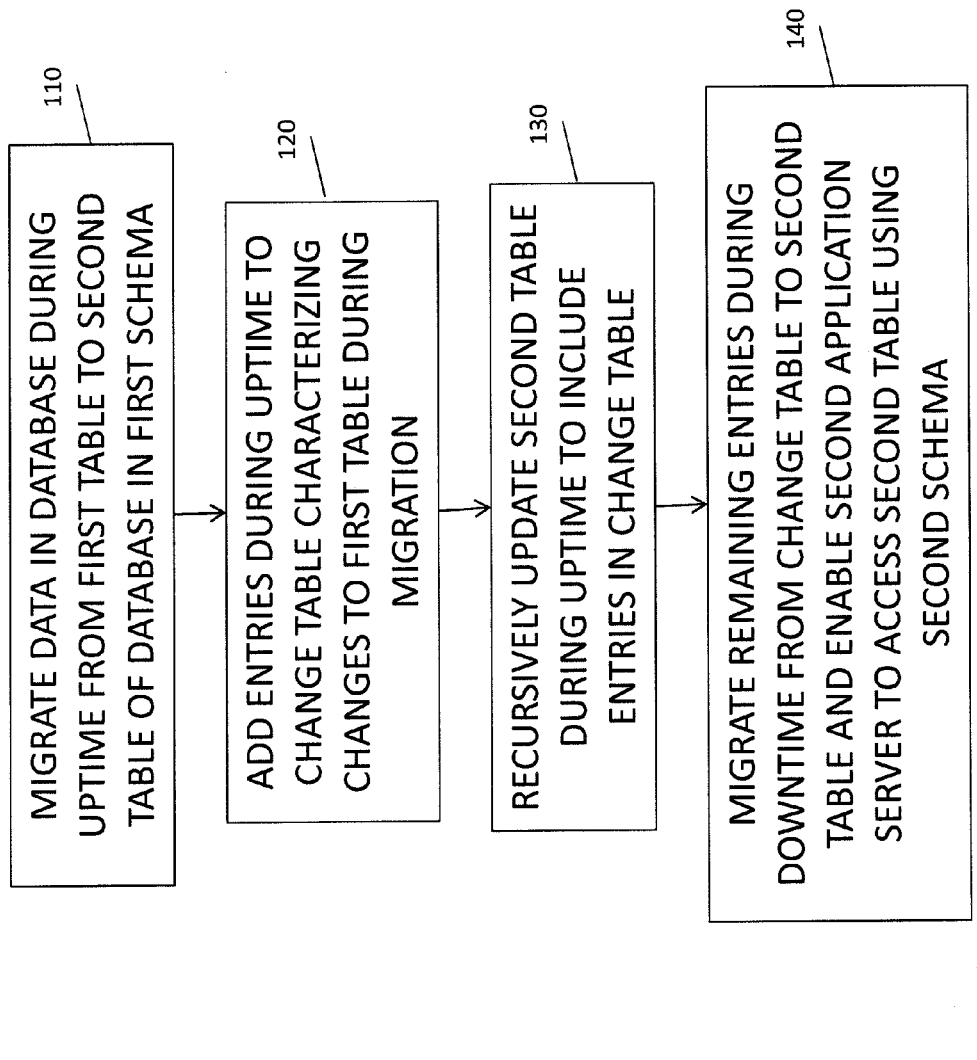
FIG. 1 is a process flow diagram illustrating a process flow diagram for migrating data.

FIG. 1 is a processing flow diagram illustrating a method 100 in which, at 110, data is migrated during uptime from a first table to a second table in a first schema in a database. A first application server connects to the database using the first schema. A second application server connects to the database using a second schema. The first application server runs a first version of a software program while the second application server runs a second version of the software program. The second schema has a first alias pointing to the first table and a second alias pointing to the second table. Entries, at 120, are added during uptime to a change table in the first schema characterizing changes to the first table during the data migration. The second schema includes a change alias pointing to the change table. Subsequently, the second table, at 130, is recursively updated to include the entries referred to in the change table using the second application server, data is read from the first alias corresponding to the entries referred to in the change table, and the data from the first alias is written to the second alias until a remaining number of the entries is below a pre-defined threshold. Later, downtime can, at 140, be initiated to migrate the remaining entries in the change table to the second table, delete the first table, and rename the second table to have a same name as the first table prior to deletion so that during uptime the second application server connects to the second table and runs the second version of the software program.

According to the current techniques, data migration is performed before downtime associated with an upgrade (referred to also as upgrade downtime or just downtime). During downtime, only a small fraction of the data to be migrated is converted according to the new release. As will be described in further detail below, data migration can be achieved by (i) creating a shadow table, having the target structure of the table; (ii) providing a trigger mechanism that identifies each content change to the original table; and (iii) providing a migration program that performs the data migration and reacts to the changes identified by the trigger mechanism. During downtime, the original table is dropped and the shadow table is renamed to the original name. The trigger mechanism is then removed.

Such an arrangement moves the tasks of reading through a large DB table, performing application logic, and inserting the data to the new table from downtime to uptime. The only tasks that then need to occur during downtime are "drop+rename" (i.e., dropping the original table and renaming the new table).

The basic idea is, to use a second system (called shadow system) during the preparation phase of the upgrade to execute upgrade tasks running within the application server. This shadow system is running the target version of the software. For example, a customer uses version 1 and wants to upgrade to version 2. The original system (or start release system) is on version 1. The shadow system and the target release system are on version 2.

Figure 2:
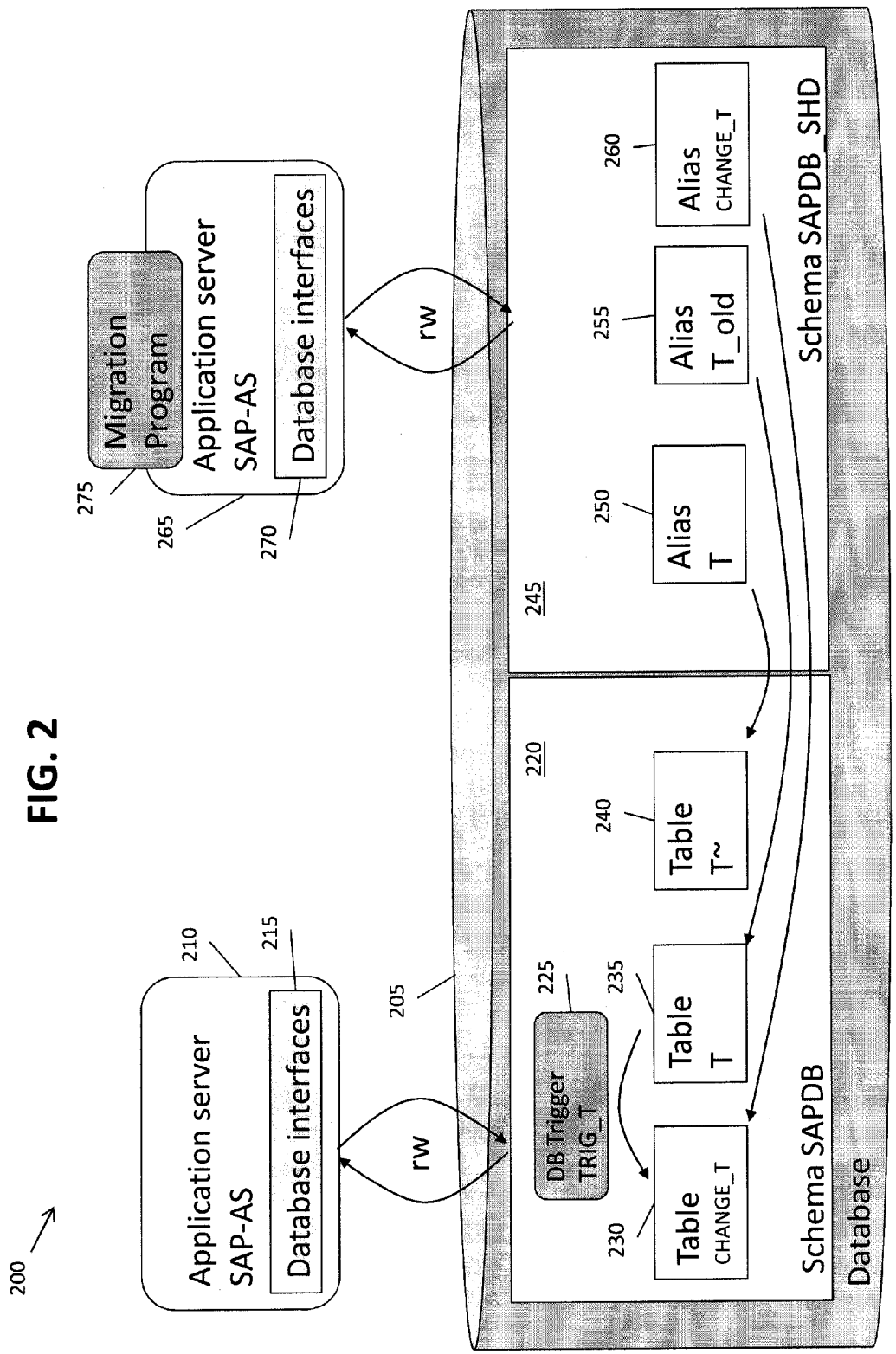
FIG. 2 is a diagram illustrating migration of data in a database.

FIG. 2 is a diagram 200 of a database 205 in which a first application server 210 accesses the database 205 according to a first schema 220 (schema SAPDB) via a first database interface 215. The first schema 220 can include a first table 235 (table T), a second table 240 (table T~), a change table 230 (table CHANGE_T), and it can execute a database (DB) trigger 225 (TRIG_T). A second application server 265 having a second database interface 270 can connect to the database 205 according to a second schema (schema SAPDB_SHD). The second application server 265 can include a migration program 275 as will be described in further detail below. The second schema 245 (schema SAPDB_SHD) can include a first alias 255 (alias T_old), a second alias 250 (alias T), and a change alias 260 (alias CHANGE_T). As used herein, the term alias refers to a database view, alias, or synonym which points to a table (unless otherwise explicitly stated). In addition, it will be appreciated that references to tables and alias are singular for illustration purposes and that a plurality of tables and/or references may be utilized depending on the desired implementation. The database can be any of a variety of database types including an insert-only database.

In the first schema 220 (schema SAPDB), for the first table 235 (table T), which needs to be converted, a second table 240 (table T~) is created. The second table 240 (table T~) can be referred to as a "shadow table". The second table 240 (table T~) is created in a namespace which is not visible to the first application server 210 (which is the productive system using the first schema 220 (schema SAPDB))—and which is different than a namespace of the first table 235 (table T). The first table 235 (table T) can have fields A, B, C and the second table 240 (table T~) can be created to have a new structure, for example, fields A, B, C, D. The second schema 245 (schema SAPDB_SHD) can then be created with the second alias 250 (alias T) pointing to the second table 240 (table T~) (e.g., SAPDB_SHD.T as an alias for table SAPDB.T~). Using the second alias 250 (alias T), the entries in the second table (table T~) can be read, updated, deleted and inserted.

The second application server 265 (which can be characterized as a shadow application server) can be started with a configuration to connect to the database 205 using the second schema 245 (schema SAPDB_SHD). The second application server 265 thus sees only the second alias 250 which has the name (i.e., namespace) of the first table T (235) as expected by the second application server 265 but the content of the second table 240 (table T~).

The second schema 245 (schema SAPDB_SHD) can be used, to create another alias, namely the first alias 255 (alias T_old) (e.g., alias SAPDB_SHD.T_old as an alias for table SAPDB.T) which points to the first table 235 (table T). Using the first alias 255 (alias T_old), the entries in the first table 235 (table T) can be read, updated, deleted and inserted. This arrangement enables an application program running on the second application server 265 and connected to the database 205 via the second schema 245 (schema SAPDB_SHD) to read data from the first alias 255 (alias T_old) and update the first table 235 (table T). Migration of data from the old structure (i.e., the first table 235 (table T) with fields A, B, C) to the new structure (i.e., the second table 240 (table T~) with fields A, B, C, D) can be enabled while the second application server 265 runs a target version of the software (i.e., version 2 which utilizes the additional field D).

As the target version of the application software (i.e., version 2) can be used, all access classes to the first table 235 (table T) can be used for the "insert". For the "read" from the first table 235 (table T), the migration program 275 can provide code which is not contained in the second application server 265 (it will be appreciated that in some implementations that migration program can be contained in the second application server 265). With this arrangement, less code of an application server needs to be adjusted for a migration scenario.

As during productive use, the table being migrated (i.e., the first table 235 (table T), is still in use and gets updates, inserts, deletes. These changes can be reflected in the migration process to ensure that data inserted in the original system (i.e., the first table 235 (table T) after start of the migration program/process is also migrated.

The incremental migration during productive use ("online") can be achieved as follows. A change table 230 (CHANGE_T) can be created in the first schema 220 (schema SAPDB) that has the same key fields as the first table 235 (table T) and at least one additional field, e.g. CHANGE. A DB trigger 225 or DB stored procedure (collectively referred to herein as a DB trigger unless otherwise specified) on an application specific code is created for the first table 235 (table T). The DB trigger 225 can (i) upon each insert, write an entry with the updated key to the change table 230 (table CHANGE_T), and a flag (e.g. "I") into the field CHANGE, or update the field CHANGE, if the key is already contained; (ii) upon each update, write an entry with the updated key to the change table 230 (table CHANGE_T), and a flag (e.g. "U") into the field CHANGE, or update the field CHANGE, if the key is already contained; and/or (ii) upon each delete, write an entry with the updated key to the change table 230 (table CHANGE_T), and a flag (e.g. "D") into the field CHANGE, or update the field CHANGE, if the key is already contained. The change of the DB trigger 225 can be within the same transaction as the original change to the first table 235 (table T). A "commit" will thus write the original change and a recording to both the first table 235 (table T) and the change table 230 (table CHANGE_T). Similarly, a "rollback" will thus rollback both of the first table 235 (table T) and the change table 230 (table CHANGE_T).

The second schema 245 (schema SAPDB_SHD) can be used, to create the change alias 250 (alias CHANGE_T) (e.g., alias SAPDB_SHD.CHANGE_T as an alias for table SAPDB.CHANGE_t, etc.). Using the change alias 260 (alias CHANGE_T), the entries in the change table 230 (table CHANGE_T) can be read, updated, deleted and inserted.

The migration process can now update fields in the change table 230 (table CHANGE_T) for each key being migrated. The key from the first table 235 (table T) can be inserted into the change table 230 (table CHANGE_T) (if not yet contained) and field CHANGE can be set to a flag (e.g. "M"). The migration process can start to process all entries currently in the first table 235 (table T) except for entries from the first table 235 (table T), where the keys are either not in the change table 230 (table CHANGE_T), or the field "CHANGE" of change table 230 (table CHANGE_T) has values "I" "U" "D".

Once the migration program 275 processes all entries it is finished. It can then be started again to process newly updated entries (those entries, which had been changed in the database 205 by the used application during the time the previous pass of the migration process). This recursive process can be repeated until the volume of data is below a pre-defined threshold. For example, for an initial migration, 1,000,000 entries need to be converted and such conversion requires one hour of time for processing. During this initial migration, 1,000 entries are changed in the first table 235 (table T). The second pass of the migration process now only needs to migrated 1,000 entries which are reflected in the change table 230 (table CHANGE_T) which requires a considerably shorter period of time (e.g. below a minute). As the second pass is considerably quicker, further iterations of the migration process are not required.

If the change volume (i.e., number of entries in the change table 230 that require migration) is below the pre-defined threshold, the system can go to downtime. During downtime, the migration program 275 can be started again to migrate the remaining data (which will run fast because only data entries that had been changed during the second pass need to be converted). Thereafter, the aliases 250, 255, 260 in the second schema 245 (schema SAPDB_SHD) can be deleted. The first table 235 (table T) can be deleted and the second table 240 (table T~) can be renamed to have the same name as the previous first table 235 (table T) (i.e., table T~ is renamed to table T). Downtime can then end.

In one variation to having the second table 240 (table T~) in the first schema 220 (schema SAPDB) along with a second alias 250 (alias T) in the second schema 245 (schema SAPDB_SHD), an equivalent of the second table 240 (table T~) can be created directly in the second schema 245 (schema SAPDB_SHD) such that the second application server 265 can access such table directly (as opposed to the first alias 250). The first alias 255 (alias T_old) can still be used to point to the first table 235 (table T). The switch after data migration can be include dropping the first table 235 (table T) in the first schema 220 (schema SAPDB) and renaming of the schema of the equivalent to the second table 240 (table T~) from the second schema 245 (schema SAPDB_SHD) to the first schema 220 (schema SAPDB) (provided that the database allows for such schema renaming).

In another variation, the change table 230 (table CHANGE_T) can be in the second schema 245 (schema SAPDB_SHD) as opposed to the first schema 220 (schema SAPDB) (or alternatively both schemas can include a change table). With this implementation, the DB trigger 225 then needs to update the change table 230 (table CHANGE_T) in the second schema 220 (schema SAPDB_SHD) (provided that the database enables such an arrangement). No alias is needed for the change table 230 (table CHANGE_T). To enable the shadow system upgrade, permissions need to be granted such that the second schema 245 (schema SAPDB_SHD) can access and change data in the second table 240 (table T~) and/or the change table 230 (table CHANGE_T).

Deadlocks can sometimes present problems. For example, there can be situations in which two instances are updating a single table (e.g., change table 230 (table CHANGE_T)) which are not using one enqueue application server but separate application servers (and for one system, the table is updated using a native DB trigger/stored procedure). One approach for handling such deadlock situations can be to generate the change table 230 (table CHANGE_T) such that the key fields are as in the first table 235 (table T) as opposed to the second table 240 (table T~). An additional field can be used "C-OR-M" which is set to C—if the trigger updated the table and M—if the migration program updated the table. Non-key fields can have a sequence with increasing numbers. Such sequence can be produced by a DB object (e.g. sequence) or a timestamp. The non-key fields can also specify the action performed (create, update, delete).

The DB Trigger 255 can create inserts or updates in the change table 230 (table CHANGE_T) as follows. If an entry is already present, the entry is updated such that a new sequence number is written and the action is updated. If the entry is new, it is inserted with a new sequence number and the corresponding action.

The migration program 275 can operate such that during a first pass, all entries in the first table 235 (table T) are read and migrated and inserted into the second table 240 (table T~). From the view of the program it is "read first table 235, update second table 240" because it is running in the shadow system. Also during the first pass, the change table 230 (table CHANGE_T) can be updated with a key is inserted with "C-OR-M" set to M and the corresponding action (which is almost always "insert"—however there may a potential for some updates).

During the second pass of the migration program 275, both potential entries of the change table 230 (table CHANGE_T) can be read: the C and the M entry If there is only a C, this entry is new and needs to be migrated. If there is only an M entry, the entry has already been migrated and can be skipped. If there is a C and an M entry, the entry needs to be converted if the sequence number of C is higher than that of M. If the sequence number of C is lower than that of M, the entry already had been converted. Together with the update of the second table 240 (table T~), the migration program 275 can also updates change table 230 (table CHANGE_T).

In addition, to avoid deadlocks, two change tables 230 (table CHANGE_T) can be used. For example, table CHANGE_R and table CHANGE_M, where table CHANGE_R takes the role of change table 230 (table CHANGE_T) with key field C_OR_M="C" and CHANGE_M takes the role of change table 230 (table CHANGE_T) with key field C_OR_M="M".

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
    migrating data during uptime from a first table to a second table in a first schema in a database, a first application server connecting to the database using the first schema, a second application server connecting to the database using a second schema, the first application server running a first version of a software program, the second application server running a second version of the software program, the second schema having a first alias pointing to the first table and a second alias pointing to the second table;

adding entries during uptime to a change table in the first schema characterizing changes to the first table during the data migration, the second schema including a change alias pointing to the change table;

recursively updating the second table to include the entries referred to in the change table using the second application server, the recursively updating comprising: reading data from the first alias corresponding to the entries referred to in the change table, and writing the data from the first alias to the second alias until a remaining number of the entries is below a pre-defined threshold; and initiating downtime to migrate remaining entries in the change table to the second table, delete the first table, and rename the second table to have a same name as the first table prior to deletion so that during uptime the second application server connects to the second table and runs the second version of the software program.

2. A method as in claim 1, further comprising deleting the first alias, the second alias, and the change alias.

3. A method as in claim 1, wherein the first alias, the second alias, and/or the change alias comprise: a database view, a database alias, or a database synonym.

4. A method as in claim 1, wherein the second table has at least one additional field as compared to the first table.

5. A method as in claim 1, wherein the changes to the first table comprise one or more of: an update, and insert, or a delete.

6. A method as in claim 1, wherein a database trigger monitors changes to the first table and generates entries in the change table characterizing the monitored changes.

7. A method as in claim 6, wherein the database trigger is a stored procedure.

8. A method as in claim 6, wherein the entries in the change table are generated by the database trigger as part of a single transaction along with a corresponding change to the first table.

9. A method as in claim 1, wherein the aliases allow for reading, updating, deleting, and inserting of entries in the corresponding table.

10. A method as in claim 1, wherein the migration of data is initiated by a migration program forming part of application software being executed on the second application server.

11. A method as in claim 10, wherein the migration program determines whether entries in the change table require migration or have already been migrated.

12. A method as in claim 11, wherein the entries in the change table include first and second fields, the first field including either a first designation indicating that a database trigger updated the entry in the change table or a second designation indicating that the migration program updated the entry in the change table, the second field comprising a sequence number characterizing when the entry was last updated;

wherein:
the entry is considered to be new and it is migrated to the second table when there is only a single entry with the first designation;
the entry is considered to have already been migrated if there is only a single entry with the second designation; and
the entry is migrated to the second table if the sequence number for the entry with the first designation is higher than the sequence number for the entry with the second designation, or the entry is skipped if the sequence number for the entry with the second designation is higher than the sequence number for the entry with the first designation when there are entries with both the first designation and the second designation.

13. A method as in claim 12, further comprising removing the database trigger once the data has been completely migrated.

14. A method as in claim 1, wherein the first application server is different from the second application server.

15. A method as in claim 1, wherein the first application server and the second application server are the same.

16. A method as in claim 1, wherein there are at least two instances adding entries during uptime to the change table in the first schema.

17. A method as in claim 16, wherein each of the at least two instances adding entries during uptime to the change table in the first schema are executed using separate servers.

18. A computer-implemented method comprising:
migrating data during uptime from a first table to a second table in a first schema in a database, a first application server connecting to the database using the first schema, a second application server connecting to the database using a second schema, the first application server running a first version of a software program, the second application server running a second version of the software program, the second schema having a first alias pointing to the first table and a second alias pointing to the second table;

adding entries during uptime to a change table in the first schema characterizing changes to the first table during the data migration, the second schema including a change alias pointing to the change table;

recursively updating the second table to include the entries referred to in the change table using the second application server, the recursively updating comprising: reading data from the first alias corresponding to the entries referred to in the change table, and writing the data from the first alias to the second alias until a remaining number of the entries is below a pre-defined threshold, each update comprising sequentially passing through entries in the change table; and initiating downtime to migrate remaining entries in the change table to the second table, delete the first table, and rename the second table to have a same name as the first table prior to deletion so that during uptime the second application server connects to the second table and runs the second version of the software program.

19. A non-transitory computer program product storing instructions, which when executed by at least one data processor forming part of a least one computing system, result in operations comprising:
migrating data during uptime from a first table to a second table in a first schema in a database, a first application server connecting to the database using the first schema, a second application server connecting to the database using a second schema, the first application server running a first version of a software program, the second application server running a second version of the software program, the second schema having a first alias pointing to the first table and a second alias pointing to the second table;

adding entries during uptime to a change table in the first schema characterizing changes to the first table during the data migration, the second schema including a change alias pointing to the change table;

recursively updating the second table to include the entries referred to in the change table using the second application server, the recursively updating comprising: reading data from the first alias corresponding to the entries referred to in the change table, and writing the data from the first alias to the second alias until a remaining number of the entries is below a pre-defined threshold; and initiating downtime to migrate remaining entries in the change table to the second table, delete the first table, and rename the second table to have a same name as the first table prior to deletion so that during uptime the second application server connects to the second table and runs the second version of the software program.

* * * * *